United States Patent Office 3,715,321
Patented Feb. 6, 1973

3,715,321
CHROMIUM OXIDE POLYMERIZATION
CATALYST
Bertalan Horvath, Southern London, England, assignor to
Phillips Petroleum Company
No Drawing. Filed Apr. 23, 1969, Ser. No. 818,806
Int. Cl. B01j 11/78
U.S. Cl. 252—441                                    5 Claims

ABSTRACT OF THE DISCLOSURE

Additives are provided to a chromic oxide catalyst system used for olefin polymerization which affect the course of reaction and/or the nature of the polymer produced, the additives being compounds of the metals of Group II-A and Group III-B of the Periodic Table.

The invention relates to polymerization.

In one of its more specific aspects, this invention relates to olefin polymerization system additives which affect the course of reaction and/or the characteristics of the polymer produced.

Polymerization of olefins in the presence of a catalyst in which a chromium compound is present is well known. Such proccesses are those in which the polymer is produced in particle form and may be characterized as those in which a polymerizable aliphatic hydrocarbon is polymerized by contacting ethylene or a mixture of ethylene with at least one other unsaturated hydrocarbon under polymerization conditions which include a temperature from about 100° to about 230° F. with a polymerization catalyst comprising chromium oxide and at least one oxide selected from the group consisting of silica, alumina, zirconia and thoria. Contact is made in a liquid hydrocarbon diluent at a temperature such that substantially all of the polymer produced is insoluble in the diluent and occurs in the diluent in the form of solid particles. Such polymeric products have a variety of reasonably predictable properties.

There have now been discovered materials, referred to hereinafter as "perturbing materials," which affect either the properties of the polymer formed or the reaction conditions under which the process is conducted.

In accordance with this invention there are provided additives to a polymerization catalyst system which comprise compounds of Group II-A and Group III-B metals of the Periodic Table which affect the reaction and/or produce polymers of altered characteristics when compared with those produced by the use of a chromic oxide-silica polymerization catalyst system. At least a portion of the chromium of such catalysts is in the hexavalent state when first contacted with the olefin.

For the purposes of this specification, "polymerization catalyst systems" are those which comprise chromic oxide and at least one support material selected from the group consisting of silica, alumina, zirconia and thoria. Without meaning to limit the invention, the following discussion is in terms of a chromic oxide-silica catalyst system.

Accordingly, it is an object of this invention to provide polymerization catalyst system additives which predictably affect the quality of the polymer formed in the olefin polymerization process.

It is another object of this invention to provide polymerization catalyst system additives which predictably affect the nature of the olefin polymerizaiton.

The polymerization process in which the perturbed polymerization catalyst systems herein discussed are employable is preferably the particle-form process in which the diluent and operating conditions are such that the polymer product is substantially insoluble and remains suspended in the diluent. Operating conditions, olefin feedstocks, catalyst activation and other operating conditions are as conventionally employed in the art.

The metals selected from Group II-A of the Perodic Table are preferably beryllium, magnesium, calcium, strontium and barium. These metals are preferably employed in the form of their oxide, which can be dry mixed according to conventional methods with the polymerization catalyst system. Other compounds of Group II-A which perform satisfactorily are the peroxides, nitrates, halides, alkoxides and salts of organic acids.

One suitable method of dry mixing of these materials into the catalyst system comprise intermixing of silica with chromic oxide, $Cr_2O_3$, and the perturbing compound in the substantial absence of water, either together or sequentially in either order. Mixing can be conducted for 1 to 120 minutes in a mortar and pestle, or the like, the resultant mixture then being activated in air.

The percentage of the Group II-A metal in the final catalyst can vary considerably. Generally, it will be present in an amount from about 0.5 to about 10 percent of the combined weight of the chromium compound, the support and the perturbing agent.

The following runs indicate the performance of various compounds of Group II-A metals in accordance with the method of this invention. These data represent the polymerization of ethylene in a particle-form process under conventional conditions with the perturbing compound having been dry mixed with a $Cr_2O_3$-silica catalyst, the reaction being carried out in isopentane diluent in a reaction zone maintained at about 220° F. and about 450 p.s.i.g.

Runs Nos. 1 through 3 were made without the addition of the perturbing compound and represent polymerization results with an unperturbed catalyst system and provides a basis for comparison for those subsequent runs made in the presence of the perturbed catalyst.

Runs No. 4 through 7 indicate the action of the oxides of calcium as the perturbing compounds; Runs No. 8 and 9 indicate the action of the oxides of barium as the perturbing compound; Runs No. 10 through 12 indicate the action of the oxides of strontium as the perturbing compound; and Runs 13 and 14 indicate the action of magnesium oxide as the perturbing compound.

TABLE I

| Run number: | Chromium wt. percent | Perturbing element Source | Wt. percent | Induction period, min. | Length of run, min. | Productivity, lb./lb. catalyst | Melt index [1] MI | HLMI |
|---|---|---|---|---|---|---|---|---|
| 1 | 2.5 | None | | 85 | 80 | 3,510 | 0.23 | 15.5 |
| 2 | 1.9 | do | | 77 | 70 | 3,400 | 0.23 | 17.8 |
| 3 | 1.0 | do | | 78 | 70 | 3,570 | 0.24 | 17.3 |
| 4 | 1.7 | CaO | 1.0 | 60 | 60 | 2,830 | 0.37 | 28.0 |
| 5 | 1.4 | CaO | 1.3 | 73 | 55 | 3,180 | 0.37 | 27.8 |
| 6 | 2.1 | CaO | 5.0 | 70 | 70 | 2,700 | 0.41 | 27.7 |
| 7 | 2.0 | $CaO_2$ | 1.5 | 73 | 75 | 3,000 | 0.33 | 23.1 |
| 8 | 1.5 | BaO | 1.5 | 50 | 80 | 3,810 | 0.27 | 21.1 |
| 9 | 1.6 | $BaO_2$ | 3.4 | 125 | 65 | 2,940 | 0.30 | 22.1 |
| 10 | 2.0 | SrO | 1.5 | 35 | 60 | 2,890 | 0.32 | 24.5 |
| 11 | 1.5 | SrO | 2.7 | 60 | 55 | 2,790 | 0.39 | 25.7 |
| 12 | 1.5 | $SrO_2$ | 1.7 | 45 | 65 | 3,180 | 0.36 | 26.2 |
| 13 | 1.4 | MgO | 0.6 | 140 | 90 | 2,440 | 0.29 | 21.3 |
| 14 | 2.0 | MgO | 3.5 | 0 | 80 | 1,020 | 0.27 | 19.6 |

[1] ASTM D 1238-62T; condition E for MI and condition F for HLMI.

The above data indicate that the compounds of Group II–A elements have a general influence upon the polymerization reaction in several respects. These runs further indicate the nature of the influence of these perturbing materials.

As previously mentioned, Group III–B metal compounds also serve as perturbing materials when introduced in the polymerization catalyst system and when employed in a method similar to that described above for the Group II–A metal compounds.

The runs given in Table II indicate the operation of the perturbing compounds of Group III–B materials. As in the previous instance, the process involved particle-form polymerization of ethylene in isopentane at about 220° F. and about 450 p.s.i.g. These data indicate that compounds of Group III–B metals act as perturbing agents in polymerization reactions over a range of from about 1 percent to about 20 weight percent of the perturbing compound element in the total catalyst.

TABLE II

| Run number: | Chromium wt. percent | Perturbing element Source | Wt. percent | Induction period, min. | Length of run, min. | Productivity, lb./lb. catalyst | Melt index [1] MI | HLMI |
|---|---|---|---|---|---|---|---|---|
| 1 | 2.5 | None | | 85 | 80 | 3,510 | 0.23 | 15.5 |
| 2 | 1.9 | do | | 77 | 70 | 3,400 | 0.23 | 17.8 |
| 3 | 1.0 | do | | 78 | 70 | 3,570 | 0.24 | 17.3 |
| 15 | 2.0 | $Sc_2O_3$ | 2.5 | 25 | 80 | 5,860 | 0.20 | 17.7 |
| 16 | 1.8 | $ScCl_3$ | 4.9 | 20 | 90 | 7,600 | 0.09 | 10.7 |
| 17 | 2.0 | $Y_2O_3$ | 7.4 | 28 | 70 | 3,040 | 0.24 | 20.0 |
| 18 | 1.8 | $YCl_3$ | 5.0 | 40 | 90 | 7,600 | 0.16 | 15.2 |
| 19 | 2.0 | $La_2O_3$ | 5.1 | 101 | 80 | 3,200 | 0.35 | 24.7 |
| 20 | 2.4 | $LaCl_3$ | 5.0 | 38 | 90 | 6,700 | 0.19 | 14.2 |
| 21 | 2.0 | $CeO_2$ | 6.2 | 44 | 75 | 3,000 | 0.11 | 10.2 |
| 22 | 2.3 | $Nd_2O_3$ | 10.0 | 53 | 60 | 3,470 | 0.22 | 19.1 |
| 23 | 2.0 | $Sm_2O_3$ | 8.1 | 105 | 70 | 3,230 | 0.27 | 21.6 |
| 24 | 2.0 | $Eu_2O_3$ | 3.0 | 14 | 90 | 4,980 | 0.17 | 15.6 |
| 25 | 2.0 | $Tb_2O_3$ | 10.0 | 38 | 90 | 5,360 | 0.13 | 13.3 |
| 26 | 2.0 | $Dy_2O_3$ | 10.0 | 50 | 90 | 4,900 | 0.10 | 11.3 |
| 27 | 2.0 | $Ho_2O_3$ | 10.0 | 54 | 85 | 4,260 | 0.16 | 16.2 |
| 28 | 2.0 | $Er_2O_3$ | 9.0 | 38 | 65 | 3,260 | 0.25 | 21.4 |
| 29 | 2.0 | $Tm_2O_3$ | 15.0 | 33 | 90 | 4,760 | 0.12 | 10.9 |
| 30 | 2.0 | $Yb_2O_3$ | 12.4 | 36 | 60 | 3,050 | 0.19 | 19.5 |
| 31 | 1.4 | $Lu_2O_3$ | 15.0 | 19 | 90 | 1,800 | 0.21 | 17.2 |
| 32 | 2.0 | $ThO_2$ | 18.0 | 38 | 90 | 2,950 | 0.07 | 9.1 |
| 33 | 2.0 | $U_3O_8$ | 15.0 | 18 | 90 | 5,220 | 0.10 | 11.9 |

[1] ASTM D 1238-62 T; condition E for MI and condition F for HLMI.

As used herein, the Group III–B metals are understood to include scandium, yttrium, the lanthanide metals, and the actinide metals.

The methods of mixing and addition of the perturbing compounds to the catalyst system as set forth above for the Group II–A metals also apply to Group III–B metals. Relatedly, the Group III–B metals can be used as a mixture of themselves or in mixtures with the alkaline earth metals. In either instance, it is preferable that the total weight of the perturbing metal, or metals, be from 0.5 to about 20 weight percent of the total catalyst.

Any of the known compounds of the Group III–B metals can be used in the preparation of the perturbing agents of this invention. These compounds include the oxides, hydroxides, halide complexes, halides, nitrates, sulfates, carbonates, acetates, oxalates, phosphates, alkoxides, alkyloxychlorides, and the like. Preferable compounds are the oxides and those compounds in which the bonding is predominately covalent, such compounds being the chlorides, alkoxides, alkoxychlorides, and related materials. The perturbing compounds of the Group III–B metals can be dry mixed with the chromic oxide-silica catalyst in the same manner described for the Group II–A metal compounds.

All the catalysts used in these tests were made by grinding sufficient chromic oxide to give the indicated chromium content for about one minute with a microspheroidal silica having a surface area of about 260 square meters per gram and an average pore diameter of about 290 A., adding sufficient oxide or chloride to give the indicated perturbing element content, grinding for an additional 15 minutes, and activating in a fluidized air bed for 5 hours at 1600° F. Grinding was with mortar and pestle.

It will be seen from the data of Tables I and II that the perturbing agents discussed herein have appreciable effects upon the polymerization reaction. In all cases there is improvement in at least one of induction period, productivity, or melt index.

It is appreciated that considerable modification can be made to the concepts set forth herein in respect to the materials concerned. However, these are considered as being within the scope of the invention.

What is claimed is:

1. In a chromium oxide polymerization catalyst consisting essentially of chromium oxide supported on an oxide of a material selected from the group consisting of silica, alumina, zirconia and thoria, at least a portion of the chromium of said chromium oxide being in the hexavalent state, the improvement consisting of including a perturbing agent consisting essentially of an oxide, hydroxide, halide, nitrate, sulfate, carbonate, acetate, oxalate, phosphate, alkoxide or alkyloxychloride of a metal selected from the group consisting of scandium, yttrium and actinium, said perturbing agent being present in said catalyst in an amount within the range of about 0.5 to about 20 weight percent of the total weight of said catalyst.

2. The catalyst of claim 1 in which said perturbing agent is scandium oxide.

3. The catalyst of claim 1 in which said perturbing agent is scandium chloride.

4. The catalyst of claim 1 in which said perturbing agent is yttrium oxide.

5. The catalyst of claim 1 in which said perturbing agent is yttrium chloride.

References Cited

UNITED STATES PATENTS

| | | | |
|---|---|---|---|
| 2,325,287 | 7/1943 | Thomas | 252—462 X |
| 2,337,191 | 12/1943 | Greensfelder et al. | 252—462 X |
| 2,375,402 | 5/1945 | Corson et al. | 252—468 X |
| 2,402,854 | 6/1946 | Thomas | 252—462 X |
| 2,411,829 | 11/1946 | Huffman | 252—468 X |
| 2,692,293 | 10/1954 | Heinemann | 252—468 OX |
| 2,726,234 | 12/1955 | Field et al. | 252—468 X |
| 2,846,425 | 8/1958 | Hogan et al. | 252—468 X |
| 2,867,578 | 1/1959 | Hirschler | 252—468 X |
| 2,887,450 | 5/1959 | Hirschler et al. | 252—462 X |
| 2,888,497 | 5/1959 | Pitzer | 260—94.9 DX |

PATRICK P. GARVIN, Primary Examiner

U.S. Cl. X.R.

252—430, 437, 438, 440, 443, 462, 463, 465; 260—94.9 D